Figure 2:
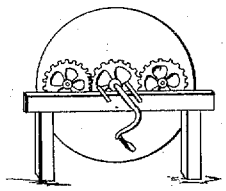
Figure 1:
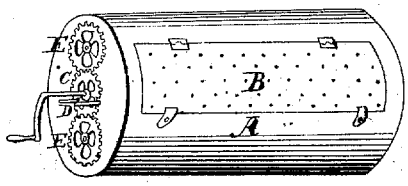
Figure 3:
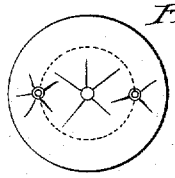

9680X

G. Reynolds.

Feather Renovator.

Patented May 23, 1836.

THE NORRIS PETERS CO., WASHINGTON, D. C.

9680X May 23 1836 317.

George Reynolds East Hartford Ct.

Letters Patent

The Schedule referred to in these Letters Patent and making part of the
same containing a description in the words of the said George Reynolds
himself of his improvement in his feather dressing Machine.

To all to whom these Presents shall come.

Be it known that I George Reynolds of East Hartford in the County
of Hartford and State of Connecticut have invented a new and useful improve
ment in the machine for dressing [illegible] old feathers and preparing new ones for
Beds and that the following is a full and exact description of the construc
tion and operation of the said machine and also of the improvement as in-
vented and improved by me. This machine consists of a cylinder or barrel
of sheet Iron copper or tin three feet more or less in length and 18 inch-
es more or less in diameter as shall best suit the operator. On one side
of the cylinder is a door which for convenience should be nearly the whole
length of the cylinder and of sufficient width for putting in and
emptying out the feathers. Through the centre of the cylinder from end
to end runs a shaft of wood or metal into which are inserted pins call
ed dressing pins of large wire or any other material that may be thought
suitable the number and length of which may be varied according to the
length and diameter of the Cylinder and the judgment of the operator. In
the centre of each end or head of the cylinder is a hole through which gudg
eons pass and screw into the ends of the shaft. One of these gudgeons form
ing part of the crank for turning the cylinder has a nut on it outside
of the head of the Cylinder which is screwed up so as to confine the head
of the cylinder and end of the shaft so that both may turn together.
The Gudgeons may be screwed out and the shaft taken out at pleasure.
Upon the neck of one of these gudgeons (it may be at either end of the cylinder)
is a tooth wheel so fixed that the gudgeon may revolve within the centre
hole of the wheel without turning the wheel. Between the centre
~~centre~~ shaft and the outside of the Cylinder are one, two or more auxiliary shafts each carrying a set of dressing pins so placed as
to play between those in the centre shaft. These shafts turn upon gud
geons also passing through the heads of the Cylinder. On the gudgeons
of these shafts at the end where the toothed wheel is placed on the cen
tre shaft gudgeon are fixed corresponding toothed wheels playing into the
centre one so that when the cylinder is made to revolve on the main shaft
the auxiliary shafts revolve in the opposite direction the centre wheel be
ing in this case prevented from revolving by means of two short arms fas
tened to the front of the wheel and resting on the frame or bar which
supports the machine and on which the gudgeon of the main shaft
rests - The head of the cylinder next the crank is not fastened to
the body of the cylinder but made with a narrow rim similar to the
cover of a Snuff Box and sets close either within or over the body of
the cylinder and can be taken off when necessary to take out the
shaft. Both heads may be made in the same manner if preferred.
In the ends or heads of the Cylinder are several small holes for letting
out air and steam and in the door of the cylinder are numer-
ous small holes for sifting out whatever of dirt may be among the
feathers. To use this machine if in a room with a fire Place
a sort of stove suited to the size of the machine may be built of brick
on the hearth filling up the fire Place except an opening at top
to take off the smoke. In this a small fire is kindled over which
the machine is hung by the gudgeons resting on boxes fitted for them
to turn upon. & over the whole may be placed a cover of sheet iron
or tin to confine the heat around the cylinder and turn the smoke
into the opening left for it. or as a stove or furnace of brick or
sheet iron may be made in which to suspend the cylinder some
what similar to a tin oven or Franklin Stove with a flue or pipe
at top to carry off the smoke or gas from the fire of wood or coal.
If made of sheet iron the whole will be rendered portable. The form
of construction is immaterial provided the heat is communicated
properly to the cylinder - The feathers to be dressed if very foul and
badly matted will require washing and when about half dry are

9680X are in proper order for dressing but this is seldom necessary. in most ca
ses they need only to be wet more or less according to the condition they are in.
A sufficient quantity to operate upon are put into the machine and the machine
placed over the fire. when the cylinder is turned slowly around till
the feathers are entirely dry which may be known from the steam
ceasing to issue from the holes in the heads of the cylinder. The feath
ers are carried round with the cylinder till they come to the top when
[illegible] they fall. the pins in the several shafts at the same
time separating and working them up loose and by constantly
changing their position give them an equal chance to the heat and
however dead and matted before they come from the machine
as light and lively as new feathers. If the feathers have contracted any disagreeable odor a small
quantity of the solution of Chloride of lime sprinkled on them
before the operation will entirely destroy it. When one batch or
filling is done the machine is taken from the fire and placed on
stanchions or scaffolds for the purpose (or a light frame on which
the machine may rest permanently and be placed over and remo
ved from the fire all together may be preferred) when by open
ing the door and turning it down the feathers are emptied out
then turning the door up again the cylinder is filled and placed
over the fire for another operation. By this process every disagrea
ble odor either in old or new feathers is entirely removed. every
insect and mite destroyed and all dust sifted out. In new
feathers this process is very useful by destroying the animal mat
ter which adheres to them and thus fitting them properly for
new beds. I do not claim as my invention the cylinder, the
shafts the pins - nor indeed any several part of the machine taken
by itself but I do claim as my invention the combination of
the several parts of the machine as above described and applica
ble to the particular object aforesaid and the manner of commu
nicating the heat to the feathers by means of the revolving of the cylin
der presenting every side to the fire in rotation and communica
ting the heat to every part of the feathers as they are kept in con

9680X lineal motion by the [illegible] pins: the revolving of the cylinder and the auxiliary shaft and are not liable to burn or be overheated The foregoing specification is copied from a former one on which Letters Patent were granted me dated Oct 17 1835. excepting only such alterations and additions as are necessary on account of the improvement in the machine which I am desirous of securing. This was judged necessary in order to explain more clearly the ~~the~~ improvement as connected with the machine in its construction and operation as appears by the drawings making a part of the specification and the references therein contained. The improvement in this feather dressing machine which I claim as my invention other than what is already patented consists in the addition and combination of the auxiliary shaft or shafts with their pins and the toothed wheels gearing into each other in the manner herein described so as to carry the auxiliary shafts around the main shaft while at the same time they revolve on their own axes Witnesses J O Reynolds T. [illegible]

George Reynolds.

1469 words

Ex'd ck'd W.

(Patented May 23. 1836.)

[illegible]